Sept. 10, 1940.   L. A. LAYNE   2,213,987
SCREEN AND GRAVEL WASHING DEVICE AND METHOD
Filed Feb. 20, 1937   2 Sheets-Sheet 2

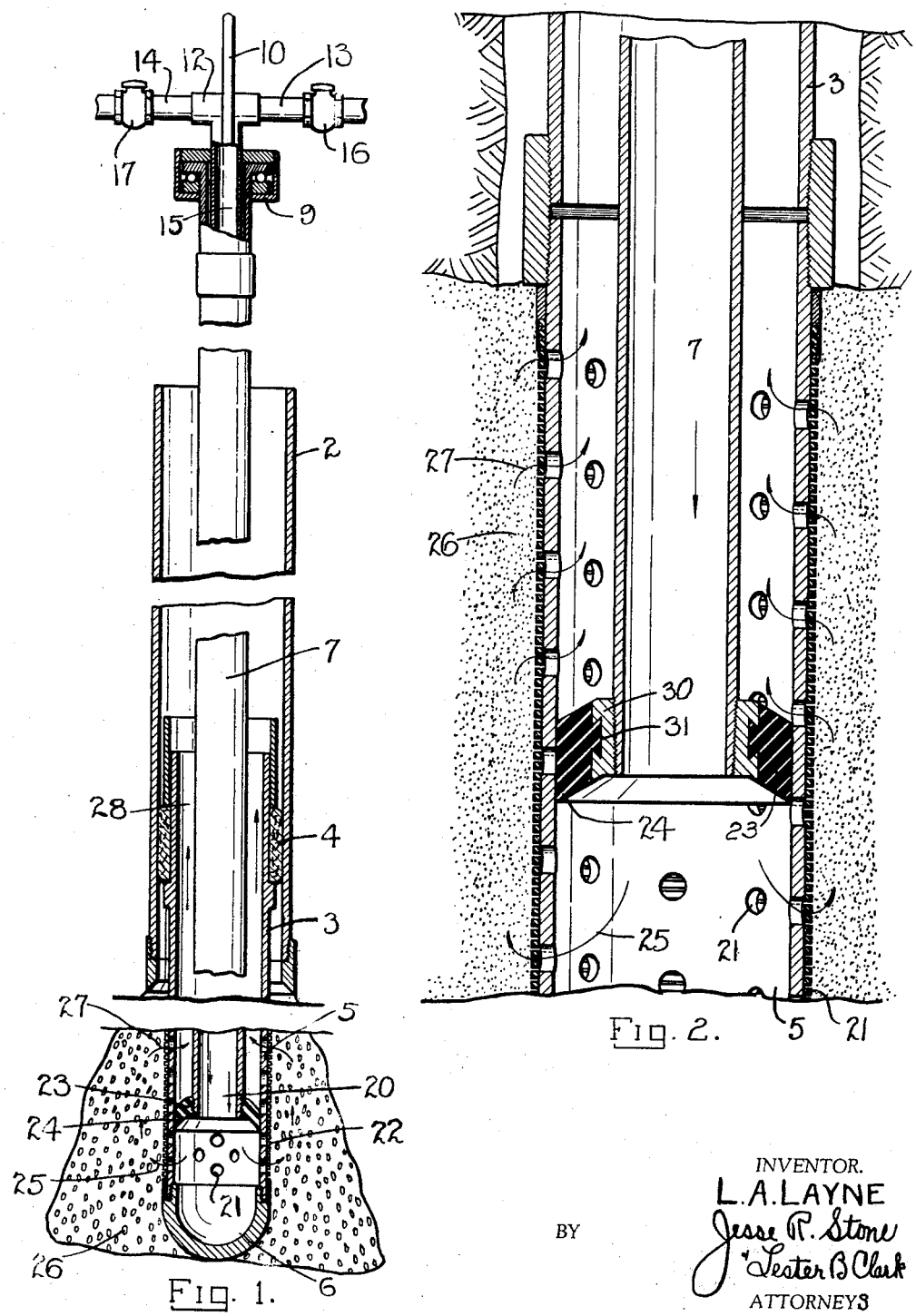

L. A. LAYNE
INVENTOR
BY Jesse R Stone
Lester B Clark
ATTORNEYS

Patented Sept. 10, 1940

2,213,987

UNITED STATES PATENT OFFICE 2,213,987

SCREEN AND GRAVEL WASHING DEVICE AND METHOD

Leslie A. Layne, Houston, Tex., assignor to The Texas Company, a corporation of Delaware Application February 20, 1937, Serial No. 126,817

6 Claims. (Cl. 166—20)

The invention relates to a screen and gravel washing device for wells so as to obtain a free flow of fluid through the screen and into the well.

Oil, gas and water are usually encountered in porous sandy formations and it is the usual practice to position a screen or strainer in the formation so as to filter the liquid to prevent the well becoming clogged. Various methods of setting the screen and arranging it in the well have been devised but the present invention contemplates an apparatus whereby the formation adjacent the well may be washed so as to eliminate any mud or very fine materials therefrom or to re-work the well after it has been in operation for some time in order to open up the screen or strainer openings.

It is one of the objects of the invention to provide a device for forcing liquid outwardly through the screen at a desired elevation in order to obtain a circulation outwardly through the screen to agitate material adjacent the screen or strainer.

Another object of the invention is to provide a device for washing the gravel which is positioned about the strainer in a gravel wall well.

Still another object is to provide a device which can be utilized to agitate the sand which has lodged about a well strainer.

Still another object of the invention is to provide a device which will form a seal with the inside of the strainer and which may be manipulated to discharge liquid at the desired elevation where the screen is clogged or where the material outside of the screen is to be washed.

Still another object of the invention is to provide a device whereby air or gas, and either water or oil may be forced downwardly through the well and outwardly through the screen at high velocity in order to agitate the granular material outside of the screen.

It is also an object of the invention to force air and water as a mixture down through the tubing at high velocity in order to move the columns of liquid inside and outside of the tubing.

It is another object of the invention to devise a method of carrying air into a well at high velocity and pressure beyond that pressure at which the air is compressed in order that it will be forced through the screen to agitate the granular material.

Other and further objects of the invention will be readily apparent when the following description is considered in connection with the accompanying drawings:

Fig. 1 is a vertical sectional view of a well bore in which the device has been positioned ready for operation in order to wash the gravel wall which has been deposited about the well screen.

Fig. 2 is an enlarged sectional view of the apparatus of Fig. 1, but illustrating it as positioned in a well where a fine sand has accumulated about the screen and is to be agitated in order to open up the screen to obtain an increased flow.

Figure 3:
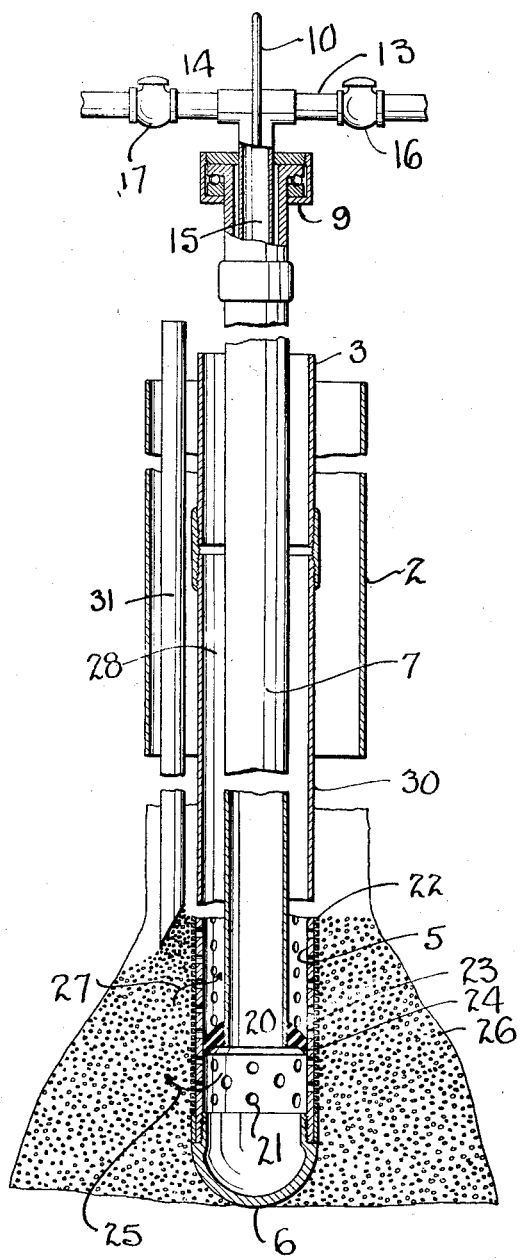
Fig. 3 shows an arrangement of the apparatus wherein a full opening screen and oil string have been shown with the gravel being deposited.

When an attempt is made to wash a well the only agitation of the material at the bottom of the well occurs because of the flow of liquid and in deep wells where the pressures are enormous it has been found difficult to agitate the sand or gravel outside of the screen when it is desired to remove foreign materials therefrom. The present invention directs itself to a method and apparatus which employs a washing fluid which may be made up of air and water, gas and water, gas and oil, or air and oil. Other combinations of a fluid and liquid may, of course, be utilized, this feature broadly contemplating the simultaneous forcing of a gas and a liquid into the well under high pressures so that an increase in the agitation of the granular material outside of the well screen will be obtained by virtue of the discharge from the screen of the bubbles caused by the fluid being forced into the well along with the liquid.

It has been found possible to inject a gaseous fluid into the well along with the liquid and to keep the fluid in vapor form only when the columns of liquid inside of the ejection pipe and outside thereof are substantially balanced, because in deep wells the pressures encountered by virtue of the weight of the column of liquid exceed the pressure at which the gaseous fluid was injected and as a result less fluid is discharged from the screen. In the present invention it is contemplated that if the well is full of liquid the rate of circulation will be increased until the liquid is traveling at a relatively high velocity. The gaseous fluid can then be gradually forced into this column of liquid and is carried downwardly into the well. The amount of gas being injected into the liquid is gradually increased as the gas begins to discharge from the well along with the liquid. In this manner both the columns of liquid in the well will gradually become aerated until the weight of the columns has been gradually reduced. In this manner a gaseous fluid can be forced through the screen to effect the desired agitation.

The apparatus by which this method is carried out may best be seen in Fig. 1 where the well casing is indicated generally at 2. This casing extends into the well and may have a liner 3 positioned therein with a packer 4 forming a seal between the casing and liner. A screen 5 is connected to the lower end of the liner and carries the usual guide shoe 6. In some instances the screen 5 may be a full-hole screen connected directly to the lower end of the casing 2.

A wash line or string of tubing 7 is shown in the well and has connected thereto a swivel head 9 so that the pipe 7 may be suspended by means of the bail 10 and then the pipe 7 may be rotated with respect to the swivel 9, if desired.

The swivel 9 is of peculiar construction having a T head 12 which accommodates the inlet lines 13 and 14, respectively. A sleeve 15 extends down through the swivel to conduct the materials being forced through the swivel head.

Check valves 16 and 17 are in the lines 13 and 14 respectively so that there can be no back or reverse flow through these pipes. For example, the pipe 13 may be used to inject the liquid such as water and the pipe 14 may be used to inject the fluid, such as air or gas.

The material forced downwardly through the pipe 7 discharges from the lower end 20 thereof into the screen 5, and is forced outwardly through the openings such as 21 therein and through the straining portion of the screen such as the wires 22.

In order that all of the material being forced downwardly through the pipe 7 will pass outwardly through the screen, a packer or sealing member 23 is carried by the lower end of the wash line 7. This packer is preferably of resilient material and may be suitably attached to the wash line and, as indicated in Fig. 1, it is downwardly and outwardly flaring so as to provide a lip 24 which forms a seal with the inside of the screen 5. With the parts in the position shown in Fig. 1, the material may be forced downwardly through the pipe and caused to discharge out through the screen, as indicated by the arrows 25. The velocity of this discharge causes an agitation of the gravel material 26 around the strainer and because of the presence of the packer 4 the liquid, fluid and finer material is then forced back through the strainer, as indicated by the arrows 27, so that it will flow upwardly in the well between the wash line and the casing through the space 28. This will be the outside column of liquid whereas the inside column of liquid will be moving downwardly through the wash line 7.

The circulation of liquid alone may be sufficient for some wells but with other wells it is desired to agitate the material so as to cause the removal of any accumulation of foreign material in the gravel or sand which is present. It will be understood that when the gravel 26 is placed in position it is usual to convey it into the well by means of a carrier liquid such as slush or mud and naturally some of this mud deposits with the gravel and each particle of gravel is usually coated with mud. In order to obtain a more efficient filtering operation with the gravel it is desired to wash out this mud accumulation after the gravel has been placed and that is one of the essential purposes of the present invention.

It is desired, therefore, to cause considerable agitation of the gravel so as to loosen the accumulation of mud. The operation therefore may be carried out by the circulation of, for example, water through the pipe 13, the wash line 7, and upwardly through the casing 2, then fluid pressure may be applied to the line 14 so that a small amount of, for example, air or gas, may be caused to flow into the column of liquid in the pipe 7. The velocity of the liquid is then increased so that the air or gas will be carried downwardly into the well. Gradually the columns of liquid inside and outside of the wash line will become aerated in this manner so that they are sufficiently balanced one with the other. The column of air or gas being added may then be gradually increased until the desired amount of agitation is being obtained at the bottom of the well. By this action the static pressure due to the weight of the liquid on the bottom of the well is reduced so that the gravel is jostled about and the mud is removed therefrom. It seems obvious that the wash pipe 7 may be raised and lowered in the screen 5 as desired in order to wash the entire area of the screen.

The form of the invention shown in Fig. 2, will operate the same as described in connection with Fig. 1, but it is shown as being applied to a well where a fine sand accumulation has occurred outside of the screen. The mixture of liquid and gaseous fluid will be forced outwardly through the screen as indicated by the arrows 25 and 27, the same as in Fig. 1.

An enlarged view of the packer or seal 23 is shown as having an anchor ring 30 thereon which has a dovetailed groove 31 so that the resilient material forming the packer can be molded thereon. The lip 24 is shown as tightly engaged against the inside face of the screen and is downwardly flaring, so that when pressure occurs beneath the packer there will be a tendency for it to move upwardly and increase the seal with the inside of the screen.

Fig. 3 shows a similar arrangement of the parts except that the liner 3 extends to the surface in the form of an oil string 30 and the casing 2 may be the surface casing which may not extend down to the producing formation. The other parts are the same as in Fig. 1, except for the gravel discharge line 31. This line extends into the well to discharge gravel around the screen or strainer. The carrier liquid may return upwardly outside of the pipe 30 or in through the screen 3 and upwardly in the area 28. The washer or agitator in the screen may be operated to settle and wash the gravel as it is deposited so that there may be several streams of fluid and liquid being directed into the well.

In some wells it may be necessary to so adjust the size of the wash line 7 with respect to the size of the casing or liner that the volume of the columns inside and outside will be equal in order to obtain the desired balance of the columns in order to carry the gaseous fluid into the well.

What is claimed is:

1. A device for washing well screen including the combination with a well screen of a pipe movable therein, a seal member on said pipe of a size to maintain a seal with the inside of said screen, a gaseous fluid inlet to said pipe and a liquid inlet to said pipe whereby liquid and gaseous fluid may both be injected into said pipe to discharge simultaneously within said screen below said seal whereby the mixture of gaseous fluid and liquid will be forced out through the screen below said seal and will flow back into the screen above said seal.

2. A gravel agitating device for wells to remove the foreign matter from a body of gravel about a well screen, including a screen, a pipe extending into the screen, a seal about said pipe, means to force a stream of liquid into said pipe, and means to force a flow of gaseous fluid into said pipe so that the liquid and gaseous fluid will discharge simultaneously from said screen at a high velocity and cause agitation of the gravel because of the mixture of gaseous fluid in the liquid.

3. A method of washing the deposit of gravel about a well screen in a gravel walled well which comprises the steps of circulating a column of liquid down the well and discharging it into the gravel outside of the screen, forcing the flow back into the screen and upwardly therethrough to the surface, gradually adding a flow of gaseous fluid to the liquid to aerate the column to reduce the pressure on the gravel, and increasing the velocity of flow so that the discharge into the gravel comprises a mixture of liquid and gaseous fluid at high velocity to agitate the gravel.

4. The combination of a well casing, a screen and liner therein, a packer to seal the space between said liner and casing, a pipe extending down into said screen, a seal between said pipe and screen, means to force a mixture of air and water through said pipe to discharge simultaneously through said screen into the well whereby said packer will force the flow back into said screen around said pipe above said seal.

5. A device for agitating gravel being deposited around a screen in a well, comprising a wash line extending into said screen, means to form a seal between said screen and said wash line, means to effect a circulation of gaseous fluid and liquid downwardly simultaneously through said wash line and outwardly through said screen to agitate the gravel being deposited in order to settle such gravel in a uniform pack about the screen.

6. The method of washing and agitating gravel being deposited about a screen in a well which comprises circulating a mixture of liquid and gas down the well and discharging it outwardly through the screen into the gravel being deposited around the screen so as to wash and agitate said gravel during the depositing operation, and then forcing said mixture back into the screen and upwardly to the surface.

LESLIE A. LAYNE.